United States Patent [19]

Kolacz

[11] 4,310,081

[45] Jan. 12, 1982

[54] PARK LOCK AND RANGE SHIFT CONTROL

[75] Inventor: Ferdynand Kolacz, New Berlin, Wis.

[73] Assignee: Allis-Chalmers Corporation, Milwaukee, Wis.

[21] Appl. No.: 106,684

[22] Filed: Dec. 26, 1979

[51] Int. Cl.³ .............................................. B60K 41/28
[52] U.S. Cl. ..................................... 192/4 A; 74/475
[58] Field of Search ............ 192/4 A, 4 R, 20, 48.91; 74/411.5, 473 P, 473 R, 475, 477

[56] References Cited

U.S. PATENT DOCUMENTS

| | | | |
|---|---|---|---|
| 3,601,231 | 8/1971 | Kolacz ................................. | 192/4 A |
| 3,987,879 | 10/1976 | Longshore et al. ................ | 192/4 A |
| 4,089,394 | 5/1978 | Haupt et al. ....................... | 192/4 A |
| 4,177,886 | 12/1979 | Hiraiwa et al. .................... | 192/4 A |

*Primary Examiner*—George H. Krizmanich
*Attorney, Agent, or Firm*—Arthur L. Nelson

[57] ABSTRACT

A park lock and range shift mechanism including a reciprocating and pivotal shaft operated by a shift lever. Reciprocal movement of the shaft operates the park lock while pivotal movement of the shaft operates the range shift of the transmission.

10 Claims, 4 Drawing Figures

PARK LOCK AND RANGE SHIFT CONTROL

This invention relates to a vehicle transmission and more particularly to a park lock and range shift mechanism having a reciprocal and pivotal shaft which reciprocates to operate the park lock and pivots to shift the range shift transmission.

Conventional vehicle transmissions are provided with a shift lever for selectively engaging gear ratios and also for controlling the park lock. The park lock mechanism locks the drive shaft and prevents the vehicle from rolling when the engine is not operating. The conventional shift pattern for use on a vehicle of this type usually provides for the selective operation of shift rails to selectively engage the desired gear ratio, and also a position in the shift pattern for the park lock. This invention provides for a shifting mechanism without a shift rail and a park lock operated by the same lever. The park lock is operated by reciprocating a transverse shaft means to operate a carriage and roller. The roller engages an inclined surface on the park lock pawl for selectively engaging a gear segment on the pawl with the gear teeth on a drive shaft gear.

Pivotal movement of the transverse shaft means selectively operates the shifting mechanism in a range transmission to selectively engage the high and the low speed. Normally, a range transmission is positioned in series with the main transmission to double the speed ratios of the transmission to provide an overall speed ratio of some multiple of the main transmission. Accordingly, this invention is provided with a side-mounted shift lever which selectively operates a high, a low, and a park lock position of the range transmission.

It is an object of this invention to provide a park lock and a gear shift mechanism in a vehicle transmission.

It is a further object of this invention to provide a park lock and range shift including a reciprocal and pivotal shaft for operation by a shift lever.

It is a further object of this invention to provide a park lock and range shift mechanism mounted on the side of the vehicle transmission for reciprocating and pivoting a transverse shaft to selectively operate a park lock for locking the drive shaft of the transmission and to operate the range shift mechanism to provide a high-speed and a low-speed position of the range transmission.

The objects of this invention are accomplished in a range transmission by a shift mechanism mounted on the side of the transmission for reciprocating and pivoting a transverse shaft means to operate a park lock and range shift. Reciprocation of a quill shaft operates a carriage and roller which engages an incline surface on an arm of the park lock pawl. The park lock pawl pivots to engage a gear segment on a pawl arm and gear teeth on a gear carried on the drive shaft. Reciprocation of the shaft and carriage operates the roller for engagement and the release of the pawl arm, since a spring will release the park lock when the carriage is reciprocated in the reverse direction.

A transverse shaft received in the quill shaft carries a yoke connected to a clutch sleeve which is reciprocated fore and aft to selectively engage a high/low clutch position on the range transmission. Operation of the range transmission is not possible when the park lock is engaged and the park lock cannot be engaged when the range transmission is in gear.

Referring to the drawings, the preferred embodiment of this invention is illustrated.

Figure 1:
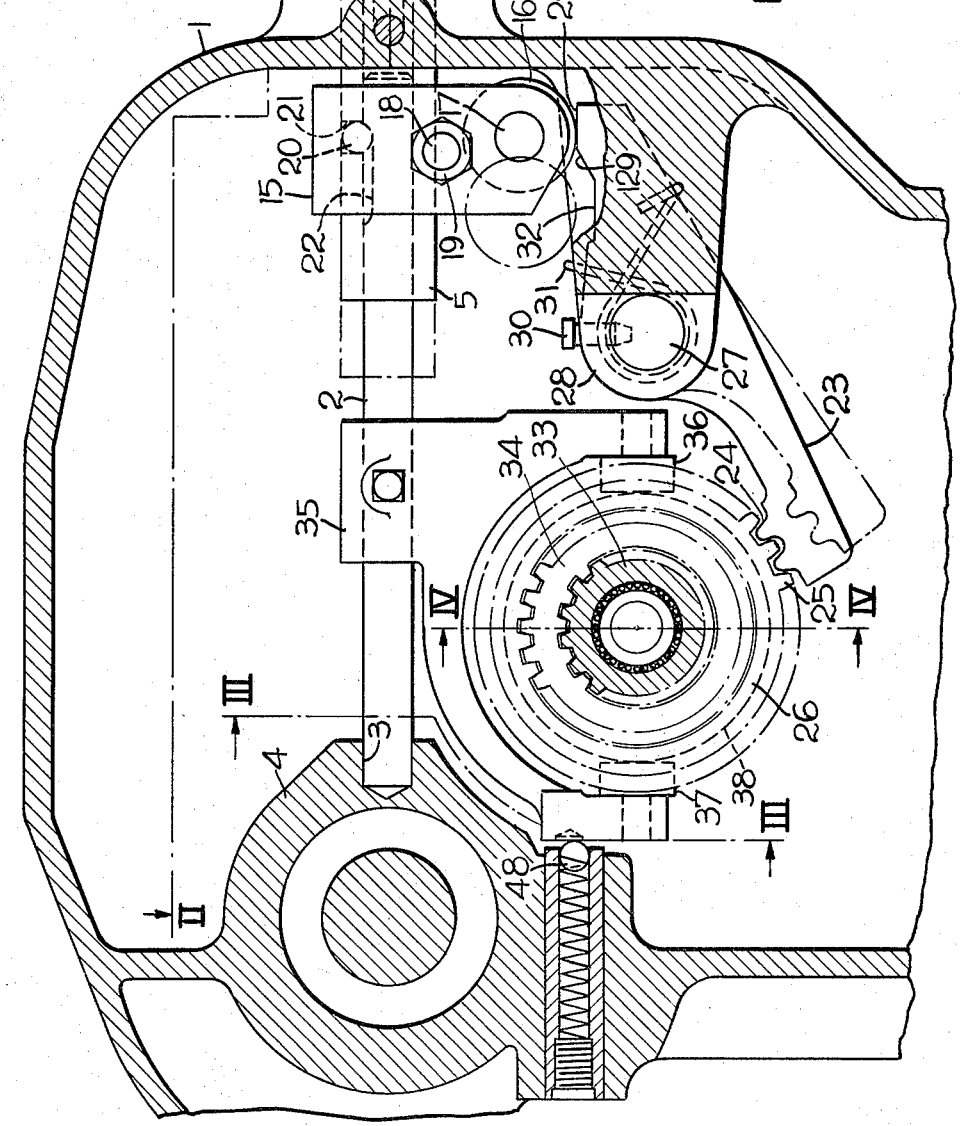
FIG. 1 illustrates a cross-section view of the transmission showing the transverse shaft operated by the shift lever.

Referring to the drawings, FIG. 1 shows a transmission housing 1 with transverse shaft 2 rotatably mounted in opening 3 of the bearing support 4 and the quill shaft 5. The quill shaft 5 is reciprocally and pivotally mounted in bearing casing 6 formed by the transmission housing 1. The bearing casing 6 carries the bracket support flange 7. The bracket support flange embraces the quill shaft 5 and is welded to the bearing casing 6. The lever support bracket 8 is rotatably supported by the peripheral flange 9 in the bracket support flange 7. The lever support bracket 8 carries a pin 10 which extends through the bracket and pivotally supports the lever 11. Cotter pin 12 retains the pin 10 in its position on the lever support bracket 8. The shift lever 11 extends upwardly to where it is pivotally connected by a pin 13 which extends through a stub shaft 14 which is welded to the end of the quill shaft 5. The stub shaft 14 is reciprocated and pivoted with the quill shaft 5 by the shift lever 11.

A quill shaft 5 supports the carriage 15. The roller 16 is rotatably mounted on the pin 17 extending through the carriage 15. The bolt 18 and nut 19 fasten the carriage on the quill shaft 5. A nonrotatable alignment of the carriage 15 on the transverse shaft 2 is maintained by the ball 20 received within the socket 21 in the quill shaft 5. The ball 20 rides in the recess 22 as the quill shaft 5 is reciprocated on the transverse shaft 2.

The park lock pawl 23 is formed with a gear segment 24 for engaging teeth 25 on the outer periphery of the clutch sleeve 26 which forms a gear on the drive shaft. The park lock pawl 23 is pivotally mounted on the pin 27 which extends through an embossment 28 on the internal portion of the transmission housing 1. The ramp 29 on the park lock pawl 23 engages the roller 16 to bias the park lock pawl in engagement with the clutch sleeve 26 to actuate the park lock pawl and engage the drive shaft brake. The surface 29 on the park lock pawl is normal to the radius of the roller 16 and, accordingly, retains the park lock pawl in engagement once the park lock is actuated. The park lock pawl 23 is retained on the pin 27 by the set screw 30. The spring 31 retracts the park lock pawl 23 from its engaged position when the carriage and roller are moved to the position wherein the roller is allowed to drop into the recess 32.

The clutch sleeve 26 is formed with an inner peripheral spline for engaging the clutch hub 34. The clutch hub 34 is fastened to the drive shaft 33. The clutch sleeve 26 can be reciprocated on the spline of the clutch hub to selectively engage each of the two gears for the high/low shift positions.

The shifting from high/low is accomplished through the transverse shaft 2 which carries the yoke 35. The yoke 35 is equipped with inserts 36 and 37 extending into the annular recess 38 of the clutch sleeve 26. As the transverse shaft 2 is pivoted, it selectively shifts the clutch sleeve 26 to the high gear 136 or the low gear 137 for driving through gearsets 39 and 40. The input drive shaft 100 drives the high-speed gear 136. Gearset 39 including gears 136 and 42. Gearset 40 including gears 43 and 137 transmits power in the low-speed range through gearset 39 when the clutch sleeve 26 is engaged with low-speed gear 137.

The yoke 35 is formed with recesses 46 and 47 which engage the ball 48. The ball 48 is located in the bearing support 4, is spring loaded, and selectively engages the recesses 46 and 47 as the yoke is pivoted to each of the two positions for engagement of the high/low speed range.

The detent element 50 selectively engages the recess 51 or the annular groove 52 as the quill shaft 5 is reciprocated within the transmission.

The retainer pin 54 retains the ball 55 which follows in the axial groove 56 and annular groove 52 as the quill shaft 5 is reciprocated and then rotated. The grooves guide the movement of the quill shaft 5 on its axis when the transmission is shifted. The quill shaft and transverse shaft 2 are nonrotatably aligned by a ball 20 in recess 22.

The operation of the device will be described in the following paragraphs.

The shift lever 11 is mounted on the shift lever support bracket 8 and it is pivotally connected to the stubshaft 14. Normally the shift lever is positioned in the vertical position with the detent 50 in the annular groove 52. When it is desired to actuate the park lock, the lever 11 is pivoted in a right-hand direction reciprocating the quill shaft 5 which reciprocates the carriage 15 which causes the roller 16 to roll up the ramp 129 onto the surface 29 which engages the park lock forming the gear segment 24 to engage the teeth of the clutch sleeve 26. The clutch sleeve 26 is connected to the clutch hub 34 through a spline connection and, likewise, the clutch hub is connected through a spline connection to the drive shaft 33 to lock the drive shaft. In this position, the shift lever cannot be shifted into the high/low range because the ball 55 is in the groove 56. The detent element 50 is in the recess 51.

The releasing of the park lock is caused by pivoting of the shift lever 11 in the left-hand direction which moves the quill shaft 5 in the left-hand direction. This causes the carriage 15 to move to the left and the roller 16 rolls off the surface 29 across the ramp surface 129 and rolls into the recess 32. The spring 31 retracts the park lock lever 23 and disengages the gear segment 24 from the gear teeth 25. Accordingly, the park lock is then released and the detent 50 will seat in the annular recess 52. The ball 55 will also be seated in the annular recess 52. In this position, the shift lever 11 can be shifted fore or aft to shift the transmission in the high-speed range or the low-speed range. Shifting the shift lever 11 downwardly, as viewed in FIG. 2, will cause the clutch sleeve 26 to engage the clutch teeth 81 on the gear 136. This will connect the clutch hub 34 with the gear 136 and produce a direct drive from the input shaft 100 to the drive shaft 33. The transmission is in the high-speed range in this position. The ball 48 will drop into the recess 46.

Figure 2:
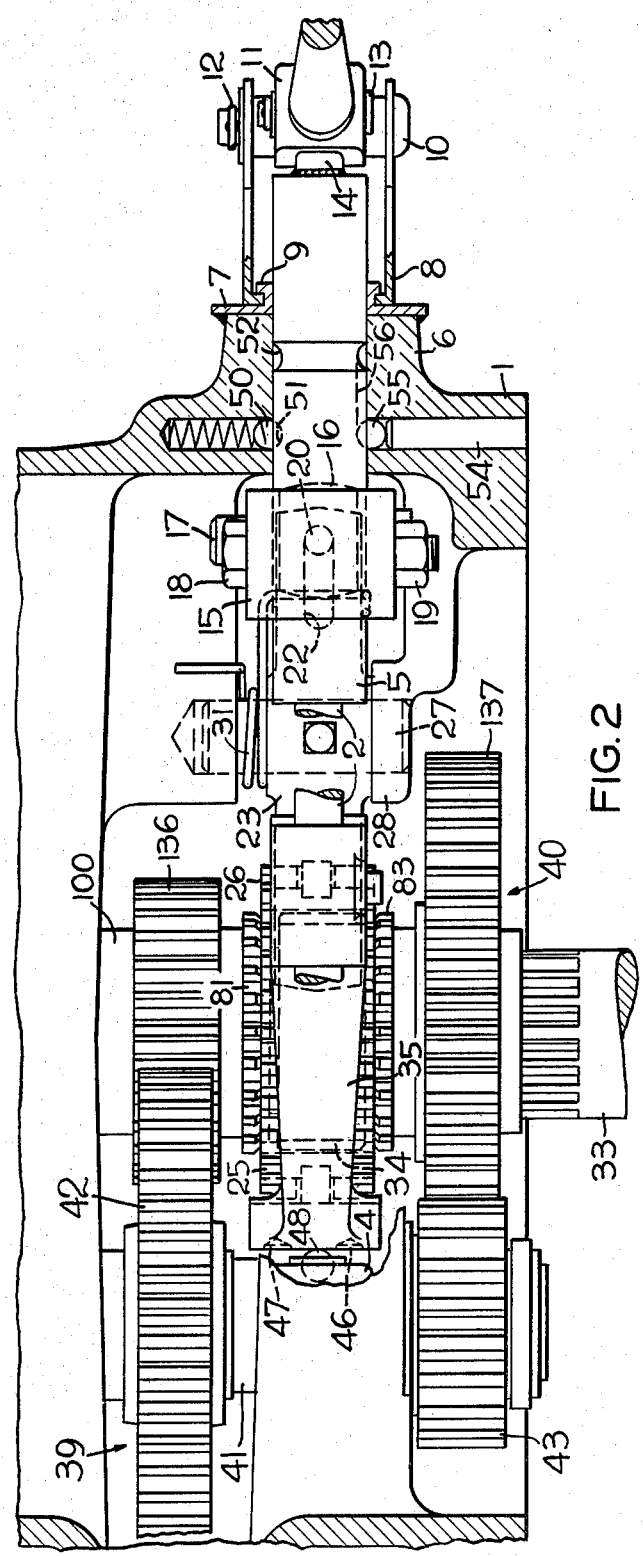
FIG. 2 is a cross section plan view of the vehicle transmission taken on line II—II of FIG. 1, showing the mechanism and the gear sets providing the high and low speed ranges.
Figure 3:
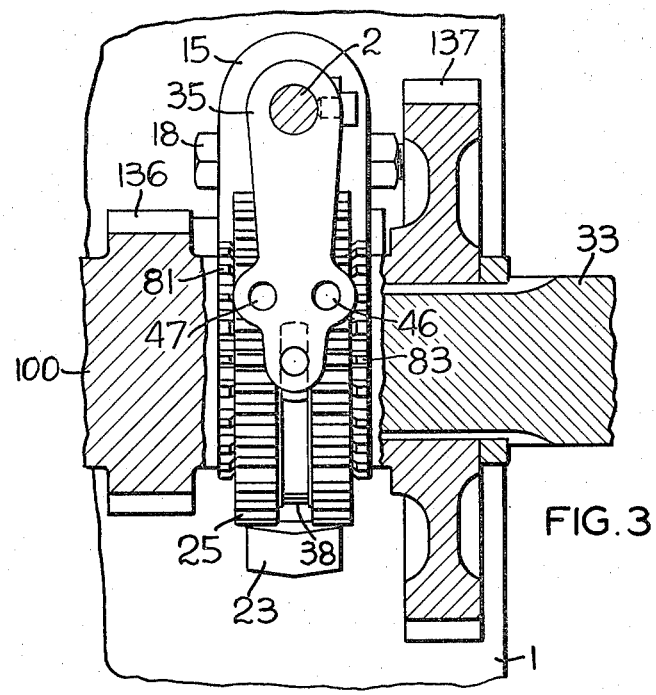
FIG. 3 is a partial cross section side elevation view taken on line III—III of the transmission of FIG. 1 showing the detent mechanism of the high/low shift range.
Figure 4:
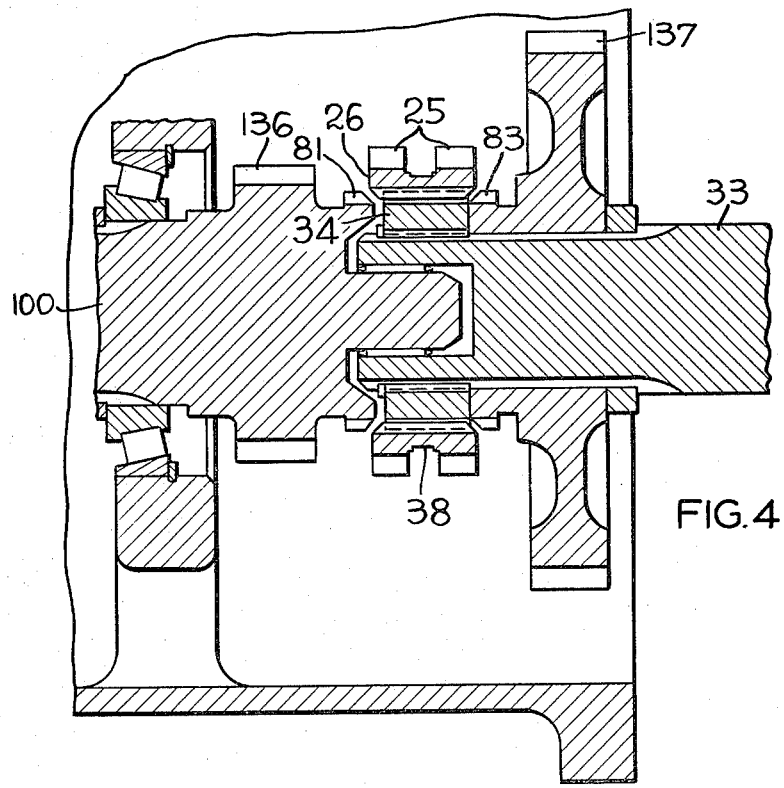
FIG. 4 is a cross section view of the shifting collar and associated parts taken on line IV—IV of FIG. 1.

When it is desired to shift the transmission from the high-speed range to neutral the shift lever is moved upwardly as viewed in FIG. 2 and the yoke 35 will move to the neutral position disengaging the high speed gear 136. To shift the transmission into the low-speed range, the shift lever will be moved to cause the clutch sleeve 26 to engage the gear teeth 83. This will engage clutch hub 34 and the gear 137. Accordingly, the drive from the input shaft 100 will be transmitted through the gearsets 39 and 40 to gear 137 and the drive shaft 33. The ball 48 will drop in the recess 47 and the transmission is shifted into the low-speed range. Shifting the transmission from the low-speed gear range to neutral, the shift lever 11 wil be moved upwardly, as viewed in FIG. 2, causing the clutch sleeve 26 to shift from the gear teeth 83 and be repositioned in the neutral position. The ball 48 will be retracted from the recess 47 when the transmission is in neutral.

The embodiments of the invention in which an exclusive property or privilege is claimed are defined as follows:

1. A transmission park lock and shift mechanism on a vehicle transmission comprising, a transmission housing, a transmission including a drive shaft, a high-speed drive gear and a low-speed drive gear rotatably mounted relative to said shaft, a gear shift mechanism including a clutch for selectively coupling said shaft for drive through said high-speed drive gear and said low-speed drive gear, a transverse shaft means including a quill shaft receiving a transverse shaft extending into said transmission, a clutch sleeve in said clutch connected to said transverse shaft for selectively engaging said high-speed drive gear and said low-speed drive gear when said shaft means is pivoted on its axis, a park lock mechanism connected to said quill shaft for selectively locking said drive shaft responsive to reciprocation of said quill shaft, a bracket pivotally supported on said housing, a shift lever pivotally mounted on said bracket and pivotally connected to said quill shaft for selectively and alternatively reciprocating said quill shaft and pivoting said transverse shaft means for selectively operating said park lock mechanism and said gear shift mechanism.

2. A transmission park lock and shift mechanism on a vehicle transmission as set forth in claim 1, wherein said park lock mechanism includes a carriage on said quill shaft, said carriage includes a roller, a pawl lever defining a ramp selectively engaging said roller for selectively engaging said park lock mechanism when said carriage is reciprocated.

3. A transmission shift and park lock mechanism on a vehicle transmission as set forth in claim 1, including a detent mechanism selectively defining the high-speed range position and the low-speed range position of said shift mechanism.

4. A transmission park lock and shift mechanism on a vehicle transmission as set forth in claim 1, including a pawl lever defining said gear segment, a clutch sleeve defining gear teeth for selectively engaging said gear segment when said park lock is engaged.

5. A transmission park lock and shift mechanism on a vehicle transmission as set forth in claim 1, wherein said transverse shaft defines an axial groove maintaining angular alignment of said quill shaft and said transverse shaft.

6. A transmission park lock and shift mechanism on the vehicle transmission as set forth in claim 1, wherein said park lock mechanism includes a detent mechanism.

7. A transmission park lock and shift mechanism on the vehicle transmission, as set forth in claim 1, including means pivotally mounting said shift lever on the side of said transmission.

8. A transmission park lock and shift mechanism on the vehicle transmission as set forth in claim 1, including countershaft gearsets and direct drive for providing low speed drive and high speed drive.

9. A transmission park lock and shift mechanism on the vehicle transmission as set forth in claim 1, including a shift fork on said transverse shaft for shifting said clutch sleeve.

10. A transmission park lock and shaft mechanism on a vehicle transmission as set forth in claim 1, wherein said quill shaft defines peripheral and axial grooves to define the movement of said quill shaft for shifting gears and operating the park lock mechanism.

* * * * *